US008783393B2

(12) United States Patent
Besler et al.

(10) Patent No.: US 8,783,393 B2
(45) Date of Patent: Jul. 22, 2014

(54) INTERFACE FOR A MOTOR AND DRIVE ASSEMBLY

(75) Inventors: Mark J. Besler, Dubuque, IA (US); Carolyn Lambka Drum, Dubuque, IA (US); Chris Ruden, Peosta, IA (US); Kinte Allen, Dubuque, IA (US); Jeffrey S. Turner, Coffeyville, KS (US)

(73) Assignee: Deere & Company, Moline, IL (US)

( * ) Notice: Subject to any disclaimer, the term of this patent is extended or adjusted under 35 U.S.C. 154(b) by 547 days.

(21) Appl. No.: 13/035,077

(22) Filed: Feb. 25, 2011

(65) Prior Publication Data

US 2012/0217079 A1 Aug. 30, 2012

(51) Int. Cl.
*B60K 17/356* (2006.01)

(52) U.S. Cl.
USPC ............................................ 180/60; 475/150

(58) Field of Classification Search
USPC ........... 180/292, 65.6, 56, 60, 62, 297, 65.51; 475/150; 403/361, 288
See application file for complete search history.

(56) References Cited

U.S. PATENT DOCUMENTS

| | | | | |
|---|---|---|---|---|
| 3,865,207 A | * | 2/1975 | Schwab et al. | 180/253 |
| 4,238,014 A | * | 12/1980 | Petrak | 192/54.2 |
| 4,662,246 A | * | 5/1987 | Cheek et al. | 475/338 |
| 4,870,740 A | * | 10/1989 | Klann | 29/263 |
| 4,968,044 A | * | 11/1990 | Petrak | 277/380 |
| 5,024,307 A | * | 6/1991 | Wakabayashi | 192/40 |
| 5,520,272 A | * | 5/1996 | Ewer et al. | 192/36 |
| 5,871,413 A | * | 2/1999 | Tar et al. | 475/23 |
| 7,252,184 B2 | * | 8/2007 | Baasch et al. | 192/48.2 |
| 7,314,105 B2 | * | 1/2008 | Varela | 180/65.6 |
| 7,343,991 B2 | * | 3/2008 | Rittenhouse | 180/9.5 |
| 8,062,160 B2 | * | 11/2011 | Shibukawa | 475/150 |
| 8,100,806 B2 | * | 1/2012 | Shibukawa et al. | 475/159 |
| 8,133,143 B2 | * | 3/2012 | Schoon | 475/156 |
| 8,323,143 B2 | * | 12/2012 | Schoon | 475/337 |
| 8,544,579 B2 | * | 10/2013 | Kabrick et al. | 180/65.51 |
| 2003/0032521 A1 | * | 2/2003 | Boston et al. | 475/331 |

(Continued)

FOREIGN PATENT DOCUMENTS

| | | |
|---|---|---|
| DE | 10150302 A1 | 4/2003 |
| DE | 102008025497 A1 | 12/2009 |
| DE | 102010047008 A1 | 4/2012 |

OTHER PUBLICATIONS

German Search Report in Counterpart German Application No. 1102012202702.5 (5 pages) (Oct. 22, 2012).

*Primary Examiner* — Katy M Ebner
*Assistant Examiner* — Brodie Follman
(74) *Attorney, Agent, or Firm* — Taft Stettinius & Hollister, LLP; Stephen F. Rost

(57) ABSTRACT

The present invention provides an interface for aligning a power-producing device and a power-transferring device in a vehicle. The interface includes an axle tube housing and a flange integrally coupled at one end of the axle tube housing. The flange has a rear surface. The interface also includes a motor housing and a drive housing. The motor housing is configured to contain the power-producing device and the drive housing is configured to contain the power-transferring device. A plate is removably coupled to one end of the motor housing. The plate is coupled to the axle tube housing and has an outer diameter. The interface further includes a spindle coupled to the drive housing. The spindle has a front surface and an inner diameter. The outer diameter of the plate contacts the inner diameter of the spindle when the spindle is coupled to the flange.

20 Claims, 5 Drawing Sheets

(56) References Cited

U.S. PATENT DOCUMENTS

| | | | |
|---|---|---|---|
| 2003/0139250 A1* | 7/2003 | Bowman | 475/338 |
| 2006/0054368 A1* | 3/2006 | Varela | 180/65.5 |
| 2006/0207854 A1* | 9/2006 | Baasch et al. | 192/48.2 |
| 2007/0151823 A1* | 7/2007 | Kwoka et al. | 192/84.6 |
| 2007/0254765 A1* | 11/2007 | Marsh et al. | 475/220 |
| 2008/0230289 A1* | 9/2008 | Schoon et al. | 180/65.6 |
| 2009/0039700 A1* | 2/2009 | Gradu et al. | 301/111.02 |
| 2009/0095578 A1* | 4/2009 | Besler | 188/72.5 |
| 2009/0283345 A1* | 11/2009 | Kabrick et al. | 180/65.51 |
| 2009/0312134 A1* | 12/2009 | Schoon | 475/154 |
| 2011/0075960 A1* | 3/2011 | White et al. | 384/606 |
| 2011/0085757 A1* | 4/2011 | White et al. | 384/562 |
| 2012/0217079 A1* | 8/2012 | Besler et al. | 180/233 |
| 2012/0217080 A1* | 8/2012 | Besler et al. | 180/233 |
| 2012/0238387 A1* | 9/2012 | Stuart | 475/150 |
| 2013/0056289 A1* | 3/2013 | Shibukawa et al. | 180/62 |

* cited by examiner

US 8,783,393 B2

INTERFACE FOR A MOTOR AND DRIVE ASSEMBLY

FIELD OF THE INVENTION

The present invention relates to an interface for an electrically powered, wheel-driven vehicle, and in particular an interface between a motor and drive assembly.

BACKGROUND OF THE INVENTION

In a conventional powered vehicle, a power-producing device can deliver power to one or more wheels on the vehicle. The power-producing device can be an engine, vehicle, battery, etc. The power is transferred from the power-producing device to the wheels through a power-transferring device such as a transmission or drive assembly. The power-transferring device is connected or mounted between the power-producing device and the one or more wheels. There can be multiple connections between the different components such as shafts, gearsets, etc.

In many conventional setups, the interface between the power-producing device and the power-transferring device has limitations. The interface can be a flywheel or adapter plate that mounts to the power-producing device. In some setups, the interface is not able to pilot the housing of the power-producing device with the housing of the power-transferring device. This can cause an output shaft of the power-producing device to be misaligned with an input shaft of the power-transferring device. In addition, it can be even more difficult when three or more housings form an interface because each additional housing can increase the tolerance between the power-producing device and the power-transferring device. This increased tolerance can lead to additional misalignment.

Further, external lines are often required to supply and transfer a fluid between the devices. There can be leaks in the external lines which reduces the amount and flow rate of the fluid. This may impact vehicle performance and require additional downtime for the vehicle to be serviced (e.g., adding more fluid(s) to desired level(s)).

Another problem with many conventional interfaces between power-producing devices and power-transferring devices is the required complex machining between housings. When two housings are mounted to one another, for example, a seal may be necessary to prevent fluid from leaking through the interface of the two housings. A gasket, o-ring, or other seal may be used to prevent leakage. However, in some instances, a recess or other similar design must be machined into a surface to accompany a seal. This additional machining can add cost and time to the manufacturing of the housing. Also, if the depth of the recess is not properly machined, the two housings may not be properly sealed. Alternatively, the seal or o-ring can be cut or damaged after mounting the housings to one another.

Therefore, a need exists for an interface that pilots two or more housings to one another and simplifies the machining of the mating surfaces. A further need is for an interface that facilitates the flow of a fluid between the housings without the use of external lines.

SUMMARY

In one exemplary embodiment of the present disclosure, an interface is provided for aligning a power-producing device and a power-transferring device in a vehicle. The interface includes an axle tube housing and a flange integrally coupled at one end of the axle tube housing. The flange has a rear surface. The interface also includes a motor housing and a drive housing. The motor housing is configured to contain the power-producing device and the drive housing is configured to contain the power-transferring device. A plate is removably coupled to one end of the motor housing. The plate is coupled to the axle tube housing and has an outer diameter. The interface further includes a spindle coupled to the drive housing. The spindle has a front surface and an inner diameter. The outer diameter of the plate contacts the inner diameter of the spindle when the spindle is coupled to the flange.

In one aspect, the interface includes a groove defined in the front surface of the spindle and a seal disposed along the outer diameter of the plate. When the flange is coupled to the spindle, the seal is positioned in the groove of the spindle and is substantially surrounded by the front surface of the spindle, the rear surface of the flange, and the plate. In another aspect, the rear surface of the flange is substantially flat and contacts the front surface of the spindle.

In a different embodiment, an electric independently wheel-driven vehicle includes a motor having a motor housing and an output shaft. The vehicle also includes an axle tube housing defining an internal reservoir, an axle tube flange integrally coupled to the axle tube housing and a drive assembly having a drive housing and an input shaft. The axle tube flange has a rear surface facing a direction opposite the axle tube housing. Also, the input shaft is coupled to the output shaft. The vehicle further includes a spindle coupled to the drive assembly and an interface plate coupled to the motor housing. The spindle includes a front surface and an inner diameter and the plate has a first and second surface and an outer diameter. The outer diameter of the plate engages the inner diameter of the spindle.

In one aspect of this embodiment, the plate includes an inner diameter near the center thereof such that the inner diameter defines an opening through which the output shaft protrudes. In another aspect, the plate defines a first fluid passage which is disposed above the opening and a second fluid passage disposed below the opening. The first fluid passage can be disposed near the inner diameter of the plate and the second fluid passage can be disposed near the outer diameter of the plate. In addition, the first fluid passage fluidly couples the motor housing and the drive assembly to one another and the second fluid passage fluidly couples the drive assembly and the internal reservoir to one another. The first fluid passage and second fluid passage can include one or more orifices or slots.

In a different aspect, a bearing is provided for supporting the output shaft. The bearing is disposed at least partially in the opening of the plate. A groove can be defined in the inner diameter of the spindle. Also, a seal can be disposed along the outer diameter of the plate. The seal is compressed between the rear surface of the flange and the groove. The rear surface of the flange can be substantially flat and contacts the front surface of the spindle.

In another embodiment of the present disclosure, a method is disclosed of assembling a motor and drive assembly to a wheel-drive vehicle. The motor includes a motor housing and an output shaft and the drive assembly has a drive housing and an input shaft. The vehicle includes an axle tube housing defining an internal reservoir, an axle tube flange having a substantially flat rear surface, a spindle having a groove defined in the inner diameter thereof, a seal, and a plate having an inner diameter, an outer diameter, an air passage, and an oil passage. The inner diameter of the plate defines a central opening. The method includes sliding the output shaft through the central opening of the plate and coupling the plate to the motor housing. The motor housing is coupled to the axle tube housing and the seal is disposed around the outer diameter of the plate. The method also includes aligning the drive housing to the motor housing, coupling the drive housing to the motor housing, and compressing the seal between the between the rear surface of the flange and the groove.

In one aspect of this embodiment, the method includes aligning the outer diameter of the plate with the inner diameter of the spindle. In another aspect thereof, the method can include equalizing the air pressure in the motor housing and drive housing. In this aspect, the air passage is aligned with corresponding openings defined in the motor housing and drive housing and the drive housing and motor housing are fluidly coupled to one another. Further, the oil passage is disposed between the axle tube housing and the drive housing.

The interface plate advantageously fluidly couples the motor housing, drive housing, and axle tube housing and eliminates external lines for supplying air and oil to the different housings. An air passage incorporated in the plate allows air to pass between the motor housing and drive housing so that the pressure in both housings can be equalized. In addition, oil or any other fluid can flow between the drive housing and axle tube housing through a different fluid passage in the plate. The axle tube housing can include a reservoir or sump for the oil, for example, and therefore the internal passage through the plate reduces leaks from forming in external lines and fittings.

Another advantage of the interface plate is its function in piloting the different housings and aligning the input and output shaft to one another. The outer diameter of the plates contacts the inner diameter of the spindle and the corresponding arrangement allows the motor housing to be correctly piloted with the drive housing. The piloting function of the plate can reduce misalignment between the output shaft of the motor and the input shaft of the drive assembly. In addition, the plate is coupled to the motor housing and pilots the spindle and the motor to one another. Once coupled, the spindle can then be coupled to the axle tube housing to assemble the drive assembly to the axle tube and motor.

The interface plate also simplifies the machining of the different components. For example, the axle tube flange has a substantially flat, machined face that contacts the spindle. A machined groove or notch in the spindle allows an o-ring, for example, to seal the different housings. The coupling of the drive assembly to the axle tube housing forms a face seal with the o-ring and increases the sealing capacity at the interface of the different housings.

BRIEF DESCRIPTION OF THE DRAWINGS

The above-mentioned aspects of the present invention and the manner of obtaining them will become more apparent and the invention itself will be better understood by reference to the following description of the embodiments of the invention, taken in conjunction with the accompanying drawings, wherein.

Corresponding reference numerals are used to indicate corresponding parts throughout the several views.

DETAILED DESCRIPTION

The embodiments of the present invention described below are not intended to be exhaustive or to limit the invention to the precise forms disclosed in the following detailed description. Rather, the embodiments are chosen and described so that others skilled in the art may appreciate and understand the principles and practices of the present invention.

In its broadest sense, the present disclosure relates to an improved interface between the mounting of multiple housings. The housings can be a housing for an engine, motor, transmission, axle tube, battery pack, manifold, or any other known structure having an outer housing. The improved interface can include a plate that mounts between two or more housings and includes a means for sealing fluids contained or passing through the housings. The interface also improves alignment between a power-producing device and a power-transferring device and further simplifies the machining of different faces and surfaces of the different housings.

Figure 1:
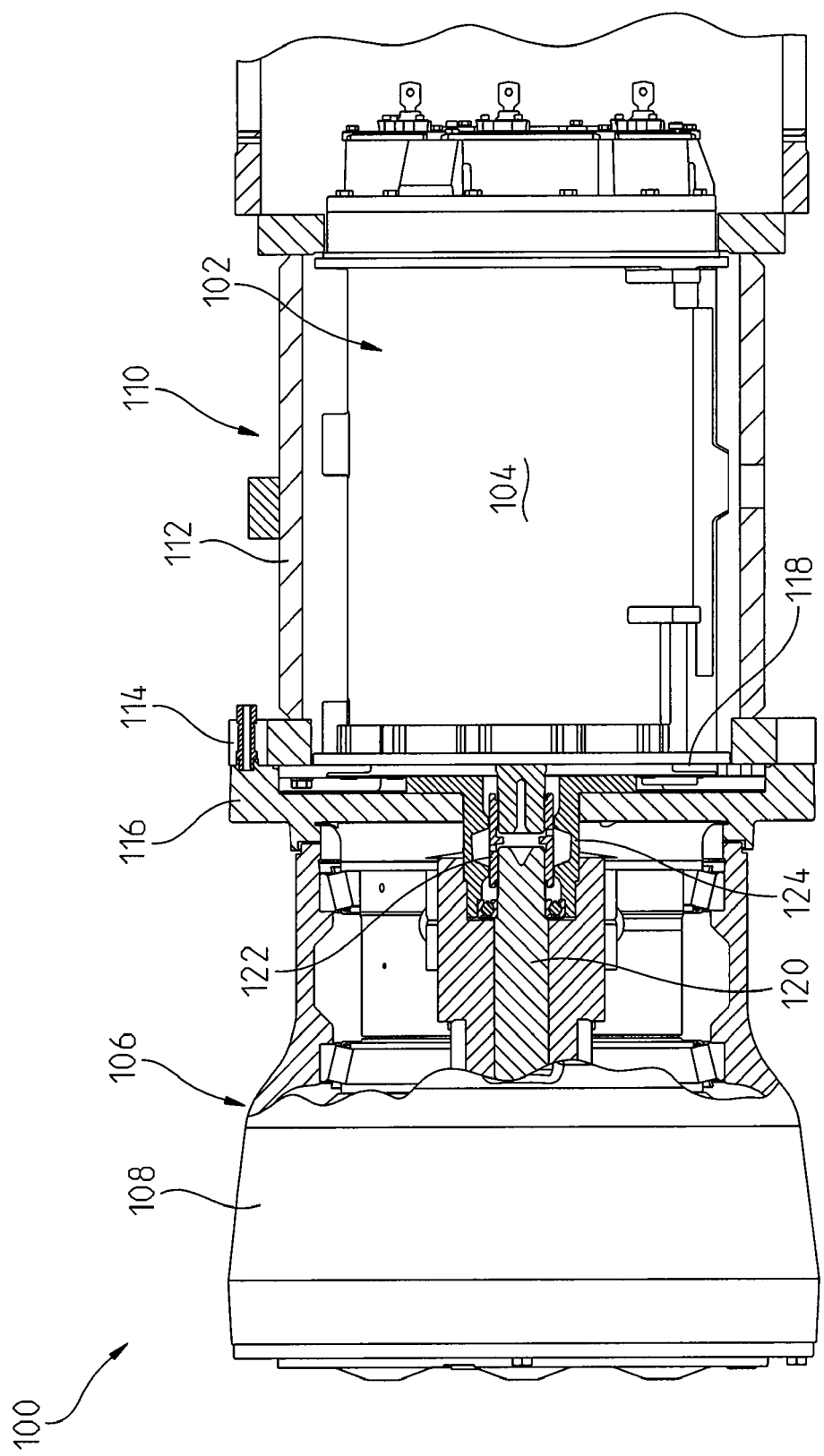
FIG. 1 is a partial side view of a portion of an axle for a vehicle having an independently powered wheel.

In one exemplary embodiment of the present disclosure, a portion of an axle 100 of a vehicle having independently power-driven wheels is shown in FIG. 1. In such a vehicle, there can be two or more axles and four or more independently power-driven wheels. The wheels are coupled to a motor or engine rather than a transmission/driveline assembly. The axle 100 can include a motor assembly 102 and a drive assembly 106. The motor assembly 102 includes an outer motor housing 104 which encloses internal components for producing torque. The torque produced by the motor assembly 102 can be transferred to the drive assembly 106 via an input shaft 120 and output shaft 204 (see FIG. 2).

The input shaft 120 is a part of the drive assembly 106 and is enclosed by a drive housing 108. The output shaft 204 is coupled to and driven by the motor assembly 102. The output shaft 204 can be coupled to the input shaft 120 by a coupler 122 and input quill 124. Torque can therefore be transferred from the motor assembly 102 to the drive assembly 106 through the output shaft 204, coupler 122, and input shaft 120.

An axle tube assembly 110 is also coupled to the motor assembly 102 and drive assembly 106. The axle tube assembly 110 includes an outer housing 112 and flange 114. In one embodiment, the axle tube flange 114 is integrally coupled to the axle tube housing 112. In an alternative embodiment, the axle tube flange 114 can be separate from the axle tube housing 112 and coupled thereto. The axle tube housing 112 further includes an internal chamber or reservoir that supplies a fluid such as oil to other components.

As shown in FIG. 1, a drive spindle 116 can be coupled to the axle tube flange 114 via a plurality of bolts (not shown). In this embodiment, the drive housing 108 rotates about the spindle 116. The drive housing 108 is coupled to the spindle by setting a wheel bearing (not shown) through a reaction plate, which is mounted to the spindle 116.

Figure 2:
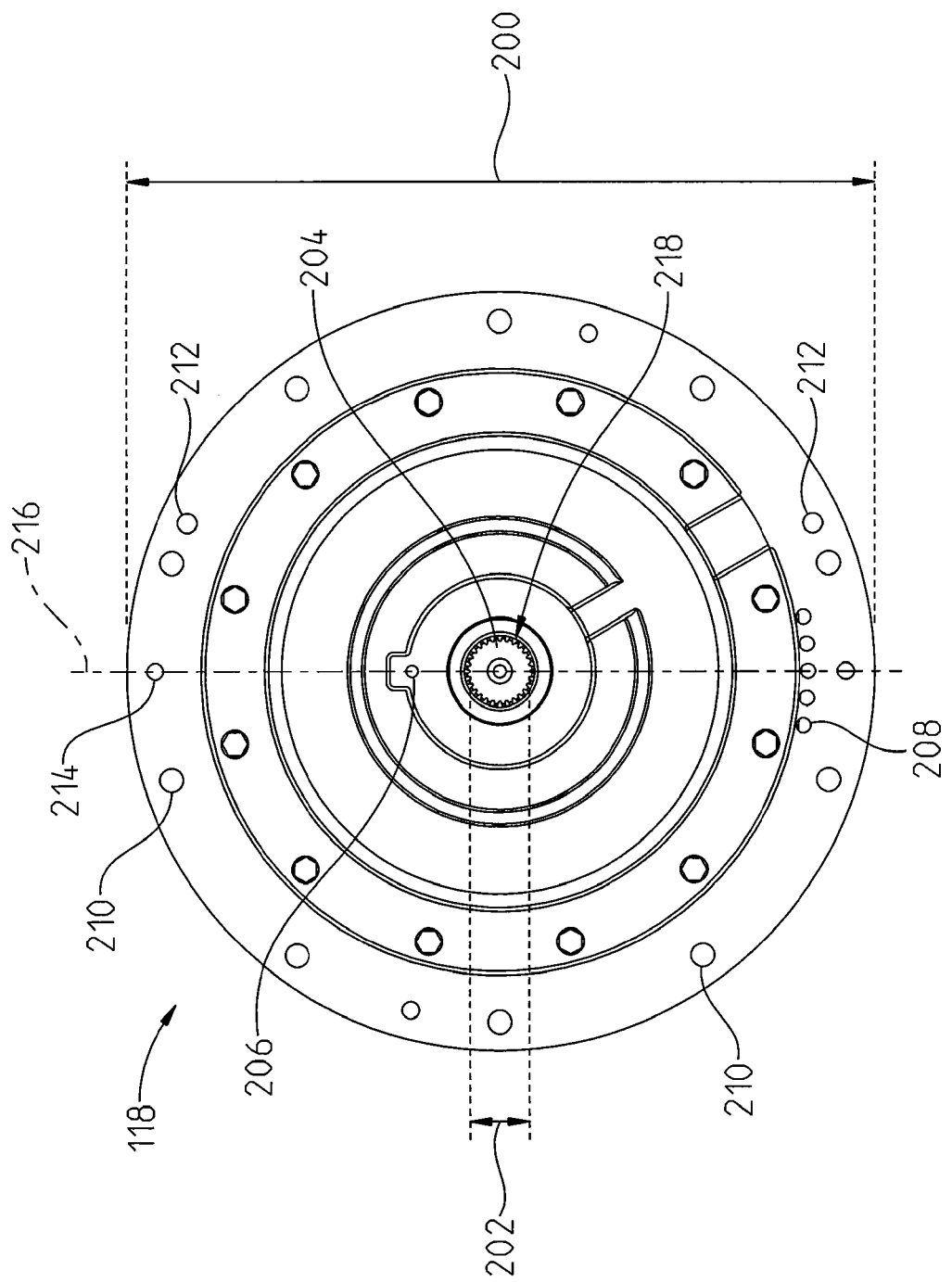
FIG. 2 is a rear view of a motor interface plate.

The interface between the drive housing 108 and motor housing 104 comprises a plate 118. The plate 118 can be made of carbon steel, ductile iron, or other known material. With reference to FIG. 2, the plate 118 includes a plurality of holes 210 defined therein for coupling the plate 118 to the motor housing 104. Bolts, screws, or other fasteners may be used to couple the plate 118 to the motor housing 104. Alternatively, the plate 118 can be integrally formed with the motor housing 104. In this alternative embodiment, the plate 118 can be welded or integrally formed such that the plate 118 is not a separate component from the motor housing 104.

The plate 118 includes an inner diameter 202 and an outer diameter 200. The inner diameter 202 defines a central opening 218 through which the output shaft 204 protrudes during assembly. In other words, the output shaft 204 is aligned with the inner diameter 202 of the plate. The output shaft 204 includes splines which extend through the opening 218 and engage a first set of splines (not shown) on the coupler 122. Likewise, the input shaft 120 includes splines which engage a second set of splines (not shown) on the coupler 122 so that the input and output shafts rotate at about the same speed.

In FIG. 2, the plate 118 also includes a first fluid passage 206 in the form of an orifice or slot through which air can pass. One or more second fluid passages 208 in the form of an orifice or slot is also provided in the plate 118. The first fluid passage 206 and second fluid passage 208 can be, for example, between 5-25 mm in diameter or any shaped slot. Alternatively, the first fluid passage 206 and second fluid passage 208 can be any desired shape or size. Air or another type of fluid can flow through the first fluid passage 206, whereas oil or another type of fluid can pass through the one or more second fluid passages 208. In the embodiment of FIG. 2, for example, there are five fluid passages 208. The first fluid passage 206 is disposed near the inner diameter 202 of the plate 118, whereas the second fluid passage 208 is disposed near the outer diameter 200 thereof.

With reference to the embodiment in FIG. 2, a vertical axis 216 is defined through the center of the plate 118. As shown, the first fluid passage 206 is defined in the plate 118 along the axis 216 and above the output shaft 204. In other embodiments, the first fluid passage 206 can be positioned to the left or right of the axis 216. The second fluid passages 208 are disposed beneath the output shaft 204, with one of the five passages 208 disposed along the axis 216. In different embodiments, the second fluid passages 208 can be disposed to the left, right, or along the axis 216 and there is no requirement that at least one passage 208 be defined along the axis 216.

The plate 118 also can include a plurality of through-holes 212 defined therein for assembling the motor assembly 102 to the axle tube assembly 110. In particular, dowel pins or the like can be inserted through these holes 212 to align the motor assembly 102 and axle tube assembly 110 to one another and further align the drive assembly 106 and the motor housing 102 to one another.

The plate 118 can also function as a hoist for assembling the motor assembly 102 to the axle tube assembly 110. In FIG. 2, the plate 118 includes a plurality of threaded holes 214 to which a jack screw or other fastener can couple. A fixture (not shown) can be mounted to the plate 118 to allow the motor assembly 102 to be lifted and coupled to the axle tube housing 112. A weight (not shown) can also be used to counter-balance the weight of the motor on one side of the plate during assembly.

Once the plate 118 is coupled to the motor housing 104, the motor assembly 102 and plate 118 can be coupled to the axle tube housing 112. As described above, bolts or other fasteners can be inserted through the openings 210 defined in the plate 118 to achieve a firm coupling. Once assembled, the drive spindle 116 can be coupled to the axle tube flange 114 using a plurality of fasteners. The drive assembly 106 can then be coupled to the spindle 116 as described above.

Figure 3:
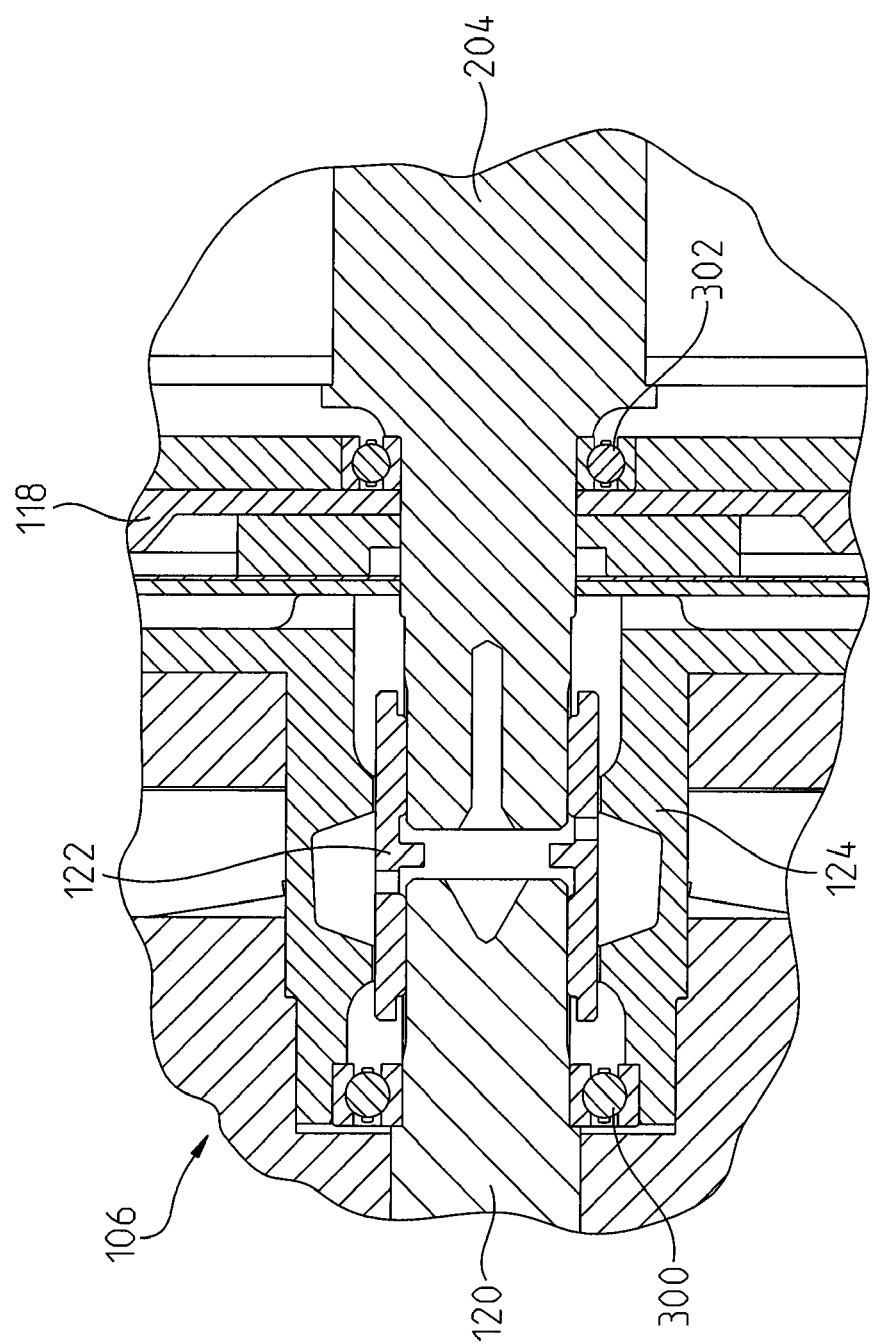
FIG. 3 is a schematic of an input shaft and output shaft coupled to one another.

As shown in FIG. 3, the drive assembly 106 can include a ball bearing 300 that encircles and supports the input shaft 120. Likewise, a motor ball bearing 302 is contained in the plate 118 and supports the output shaft 204. As such, the plate 118 is able to pilot the drive spindle 116 and corrects any misalignment between the input shaft 120 and output shaft 204. The piloting function of the plate 118 is further illustrated in FIG. 5.

Figure 5:
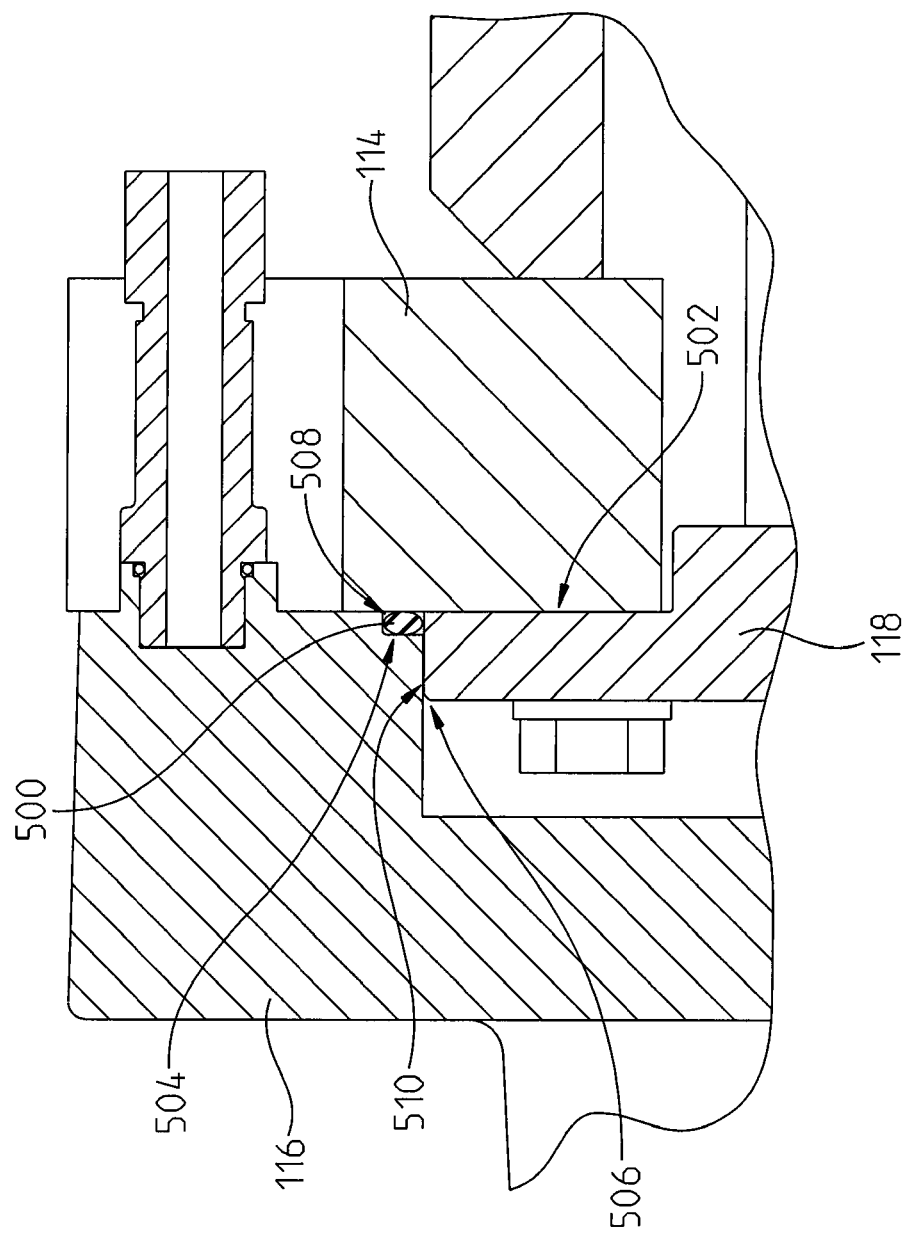
FIG. 5 is a schematic of a seal disposed between a motor interface plate, axle tube flange, and drive spindle.

As shown in FIG. 5, the drive spindle 116 includes an inner diameter or pilot surface 506 that contacts an outer surface 510 of the plate 118. The outer surface 510 of the plate defines the outer diameter 200 as shown in FIG. 2. These two surfaces (i.e., 506 and 510) ensure that the drive housing 108, which is coupled to the spindle 116, is properly aligned and mounted to the axle tube housing 112, which is coupled to the plate 118 via the motor housing 104.

As described above, the interface between the housings is sealed to prevent fluid leakage. To achieve this functionality, a seal 500 is assembled along the outer diameter of the plate 118. The seal 500 can be an o-ring, rubber seal, Teflon® seal, or any other type of seal. The seal 500 is freely positioned along the outer surface 510 of the plate 118. In other words, the plate 118 does not include a groove or recess for the seal 500 to rest in. Instead, the spindle 116 includes a machined notch or groove 504 in its front surface to accommodate the seal 500. Thus, when the axle tube flange 114 and spindle 116 are coupled to one another, the seal 500 is compressed axially in a gap or opening 508 defined between a rear surface 502 of the axle tube flange 114, the notch 504 defined in the spindle 116, and the outer surface 510 of the plate 118 to form a face seal 510.

One advantage of the plate 118 is the reduced complexity of machining the axle tube flange 114. As shown in FIG. 5, the axle tube flange 114 includes a substantially flat rear surface 502 that is simpler to machine than conventional axle tube flanges. Many conventional axle tube flanges require a complex notch or groove to be machined therein to accommodate a seal similar to the one shown in FIG. 5. In the present disclosure, however, the flange 114 is simpler to machine and the plate 118 provides a surface (i.e., outer diameter 200) on which the seal 500 rests. In addition, it is advantageous to have a single machined surface on the axle tube flange 114 to simplify the assembly of the motor housing 104 to the axle tube housing 112.

Another advantage of the plate 118 is the internal fluid passages defined therein which remove the necessity of using external lines to couple different fluid passages in the axle tube housing 112, drive housing 108, and motor housing 104. In many conventional axles, oil and air were forced through external lines and fittings. These lines often leaked fluid and required repair and service. It also was difficult to maintain pressure between housings due to losses in the external lines. The plate 118 overcomes many of these shortfalls.

Figure 4:
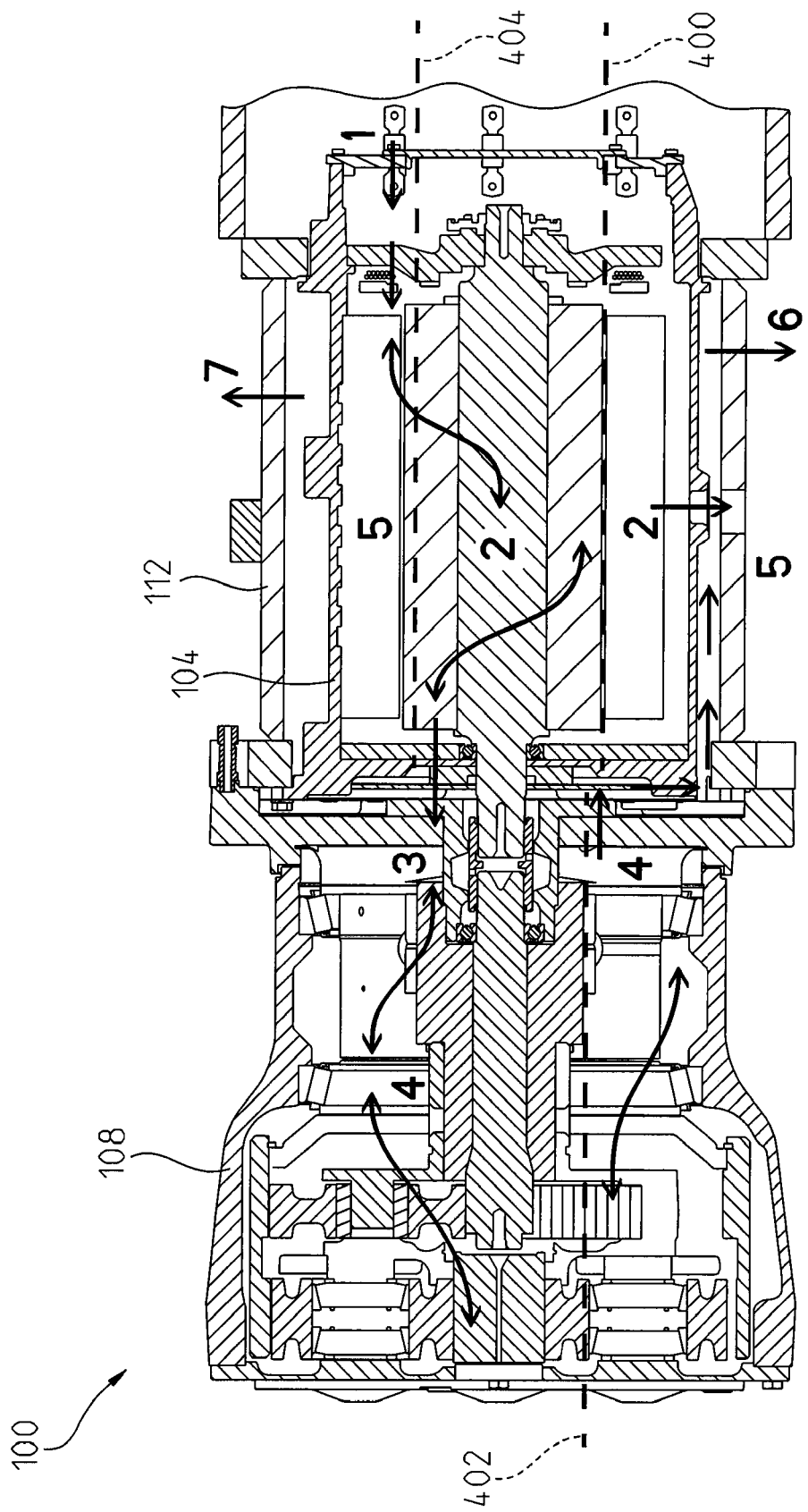
FIG. 4 is a flow diagram of air and oil flow through the axle of FIG. 1.

Referring to the embodiment in FIG. 4, the flow of fluid through the axle 100 is shown. Arrows are provided to show the different flow and corresponding numbers adjacent to each arrow further indicates the flow path. Although not shown, a source supplies pressurized air in the direction of arrow 1 into the motor housing 104. Once inside the motor housing 104, the pressurized air forces oil from inside the motor housing 104 to flow through an opening in the bottom of the housing 104 and into an internal chamber or reservoir in the axle tube housing 112. In this manner, the level of oil inside the motor housing 104 is pneumatically controlled and maintained at about the level defined by line 400. In FIG. 4, pressurized air filling the volume inside the motor housing 104 is indicated by arrow 2.

The pressurized air can escape the motor housing 104 and enter the drive housing 108 through the first fluid passage 206 defined in the plate 118 (see FIG. 2). In this manner, the motor housing 104 and drive housing 108 are fluidly coupled to one another through the first fluid passage 206. The flow of air through the first fluid passage 206 is indicated by arrow 3.

Once the air enters the drive housing 108, it fills the volume therein. As a result, an equivalent air pressure is achieved between the motor housing 104 and drive housing 108. In addition, the pressurized air forces oil that partially fills the drive housing 108 to flow into the axle tube housing 112. Similar to the oil level in the motor housing 104, the pressurized air inside the drive housing 108 pneumatically controls and maintains the oil level in the drive housing at about the level defined by line 402. The flow of pressurized air in the drive housing 108 is represented by arrow 4.

Oil can flow from the drive housing 108 to the axle tube housing 112 through the second fluid passage 208 defined in the plate 118. The second fluid passage 208 can be one or more passages, each of which can be an orifice or slot. The oil follows the path identified by arrow 5 as it flows into an annulus (not shown) that surrounds the motor housing 104 but is inside the axle tube housing 112. The motor and axle tube housings function as an oil reservoir to maintain an oil level indicated by line 404.

Oil can then be removed from the axle tube housing 112 by a source (not shown) by following a path indicated by arrow 6. Air can be vented from the axle tube housing 112 at the top thereof through a breather or valve. This is represented by arrow 7.

As shown in FIG. 4, the plate 118 allows air and oil to pass therethrough to control oil levels in the different housings. External lines and plumbing are not required. In addition, air pressure inside the motor housing 104 and drive housing 108 can be substantially equalized to control the oil levels. The location of the first fluid passage 206 allows fluid communication between the motor housing and drive housing. While other embodiments may differ, by having the location of the first fluid passage 206 defined above the output shaft 204, the oil level inside the motor housing 104 does not interfere with the passage of air through this first fluid passage 206. In addition, pressurized air entering the drive housing 108 does not have to push through the oil if the first fluid passage 206 is positioned above the oil level line 402. Thus, the first fluid passage 206 can be defined in other locations in the plate 118 so long as it is positioned above the output shaft 204.

Similarly, the second fluid passage 208 is advantageously positioned near the outer diameter 200 of the plate 118 so that only oil flows therethrough between the drive housing 108 and axle tube housing 112. In other embodiments, the one or more second fluid passages 208 can be defined in other locations in the plate. Fluid communication between the drive housing 108 and axle tube housing 112 can be possible when each second fluid passage 208 is positioned beneath the output shaft 204 and near the outer diameter 200. This also allows the oil to flow back to the reservoir inside the axle tube housing 112.

While exemplary embodiments incorporating the principles of the present invention have been disclosed hereinabove, the present invention is not limited to the disclosed embodiments. Instead, this application is intended to cover any variations, uses, or adaptations of the invention using its general principles. Further, this application is intended to cover such departures from the present disclosure as come within known or customary practice in the art to which this invention pertains and which fall within the limits of the appended claims.

The invention claimed is:

1. A vehicle, comprising:
    a motor having a motor housing and an output shaft;
    an axle tube housing defining an internal reservoir;
    an axle tube flange integrally coupled to the axle tube housing, the flange having a rear surface;
    a drive assembly having a drive housing and an input shaft, the input shaft being coupled to the output shaft;
    a spindle coupled to the drive assembly, the spindle having a front surface and an inner diameter;
    an interface plate coupled to the motor housing, the interface plate having an inner diameter and an outer diameter, the inner diameter defining an opening through which the output shaft protrudes; and
    a first fluid passage defined in the interface plate, the first fluid passage disposed above the opening;
    wherein, the outer diameter of the interface plate engages the inner diameter of the spindle.

2. The vehicle of claim 1, further comprising a second fluid passage defined in the interface plate, the second fluid passage disposed below the opening.

3. The vehicle of claim 2, wherein the first fluid passage is disposed near the inner diameter of the interface plate and the second fluid passage is disposed near the outer diameter of the interface plate.

4. The vehicle of claim 2, wherein the first fluid passage fluidly couples the motor housing and the drive assembly to one another and the second fluid passage fluidly couples the drive assembly and the internal reservoir to one another.

5. The vehicle of claim 1, further comprising a bearing for supporting the output shaft, the bearing being disposed at least partially in the opening of the interface plate.

6. The vehicle of claim 1, further comprising a groove defined in the inner diameter of the spindle.

7. The vehicle of claim 6, further comprising a seal disposed along the outer diameter of the interface plate, the seal being compressed between the rear surface of the flange and the groove.

8. The vehicle of claim 1, wherein the interface plate is integrally coupled to the motor housing.

9. The vehicle of claim 1, wherein the rear surface of the flange is substantially flat and contacts the front surface of the spindle.

10. A vehicle having at least one axle, the at least one axle including an independently powered wheel, comprising:
    a motor having a motor housing and an output shaft;
    an axle tube housing defining an internal reservoir;
    a flange coupled to the axle tube housing;
    a drive assembly having a drive housing and an input shaft, the input shaft being coupled to the output shaft;
    a spindle coupled to the drive assembly, the spindle having an inner diameter;
    a groove defined in the inner diameter of the spindle;
    a seal disposed along the outer diameter of the interface plate, the seal being compressed between a rear surface of the flange and the groove; and
    an interface plate coupled to the motor housing, the interface plate having an outer diameter;
    wherein, the outer diameter of the interface plate engages the inner diameter of the spindle.

11. The vehicle of claim 10, wherein the interface plate defines an opening through which the output shaft protrudes.

12. The vehicle of claim 11, further comprising a first fluid passage defined in the interface plate, the first fluid passage disposed above the opening.

13. The vehicle of claim 12, further comprising a second fluid passage defined in the interface plate, the second fluid passage disposed below the opening.

14. The vehicle of claim 13, wherein the first fluid passage is disposed near the inner diameter of the interface plate and the second fluid passage is disposed near the outer diameter of the interface plate.

15. The vehicle of claim 13, wherein the first fluid passage fluidly couples the motor housing and the drive assembly to one another and the second fluid passage fluidly couples the drive assembly and the internal reservoir to one another.

16. The vehicle of claim 11, further comprising a bearing for supporting the output shaft, the bearing being disposed at least partially in the opening of the interface plate.

17. A vehicle, comprising:
   a motor having a motor housing and an output shaft;
   an axle tube housing defining an internal reservoir;
   an axle tube flange integrally coupled to the axle tube housing;
   a drive assembly having a drive housing and an input shaft, the input shaft being coupled to the output shaft;
   a spindle coupled to the drive assembly, the spindle having an inner diameter;
   an interface plate coupled to the motor housing, the interface plate having an inner diameter and an outer diameter, the inner diameter defining an opening through which the output shaft protrudes;
   a first fluid passage defined in the interface plate, the first fluid passage disposed above the opening; and
   a second fluid passage defined in the interface plate, the second fluid passage disposed below the opening.

18. The vehicle of claim 17, wherein the first fluid passage is disposed near the inner diameter of the interface plate and the second fluid passage is disposed near the outer diameter of the interface plate.

19. The vehicle of claim 17, further comprising:
   a groove defined in the inner diameter of the spindle;
   a gap defined between the groove, the outer diameter of the interface plate, and a rear surface of the flange; and
   a seal compressibly disposed in the gap.

20. The vehicle of claim 17, further comprising, wherein the first fluid passage fluidly couples the motor housing and the drive assembly to one another and the second fluid passage fluidly couples the drive assembly and the internal reservoir to one another.

* * * * *